Nov. 11, 1952 L. DE FOREST 2,617,875

APPARATUS FOR COLOR TELEVISION

Filed July 29, 1948 4 Sheets-Sheet 1

INVENTOR.
LEE DE FOREST

BY Darby & Darby

ATTORNEYS

Nov. 11, 1952 L. DE FOREST 2,617,875

APPARATUS FOR COLOR TELEVISION

Filed July 29, 1948 4 Sheets-Sheet 2

INVENTOR.
LEE DE FOREST

BY Darby & Darby

ATTORNEYS

INVENTOR.
LEE DE FOREST
BY Darby & Darby
ATTORNEYS

Nov. 11, 1952 L. DE FOREST 2,617,875

APPARATUS FOR COLOR TELEVISION

Filed July 29, 1948 4 Sheets-Sheet 4

INVENTOR.
LEE DE FOREST

BY Darby & Darby

ATTORNEYS

Patented Nov. 11, 1952 2,617,875

UNITED STATES PATENT OFFICE 2,617,875

APPARATUS FOR COLOR TELEVISION

Lee de Forest, Los Angeles, Calif., assignor to Allen B. Du Mont Laboratories, Inc., Clifton, N. J., a corporation of Delaware Application July 29, 1948, Serial No. 41,319

13 Claims. (Cl. 178—5.2)

The present invention relates to color television systems and apparatus and particularly to a means for reproducing scenes by television in full natural color. In the past color television has been achieved through the use of synchronously rotating color screens, one at the television camera and another at the receiving cathode ray tube. Generally the rotating color screens were divided into three sectors, each such sector being colored with one of the three primary colors. Since the entire face of the cathode ray tube had to be covered by one of the sectors, the screen was necessarily very large and likewise had to be rotated at high speed in order that the tube face be viewed through all three sectors during the presentation of a single picture frame.

By my present invention I provide a color screen made up of small areas of the three primary colors, the entire screen being rotated through a small circular or other orbit in such manner as to present each element of the tube face through a portion of the screen colored with each of the primary colors during each frame. The screen moves, as stated in a circular or other orbit but the color elements remain in their position with respect to all other color elements, that is the screen as a whole moves in a circular path but the colored elements thereof are always in a position parallel to every other position. The motion of the screen may thus be termed parallel orbital or circular movement.

It is an object of my invention to provide apparatus and means for producing television pictures in full natural color.

It is another object of my invention to provide such means wherein the taking and viewing screens are given a movement through an orbital path while the elements of the screen remain parallel at all times.

It is a further object of the invention to provide screens which may be utilized with television camera tubes or television receiving tubes which have curved viewing faces or windows in such a manner that the screen is likewise curved so that parallax effects are eliminated.

It is a still further object of the invention to provide means for driving the color screens through their parallel orbital movement which means are mechanically simple and readily adapted to present day television scanning patterns and present day television receiving tubes and camera or iconoscopes.

Other objects and features of my invention will become apparent when the following description is considered in connection with the annexed drawings in which.

Figures 7, 8, 9, 10, 11:
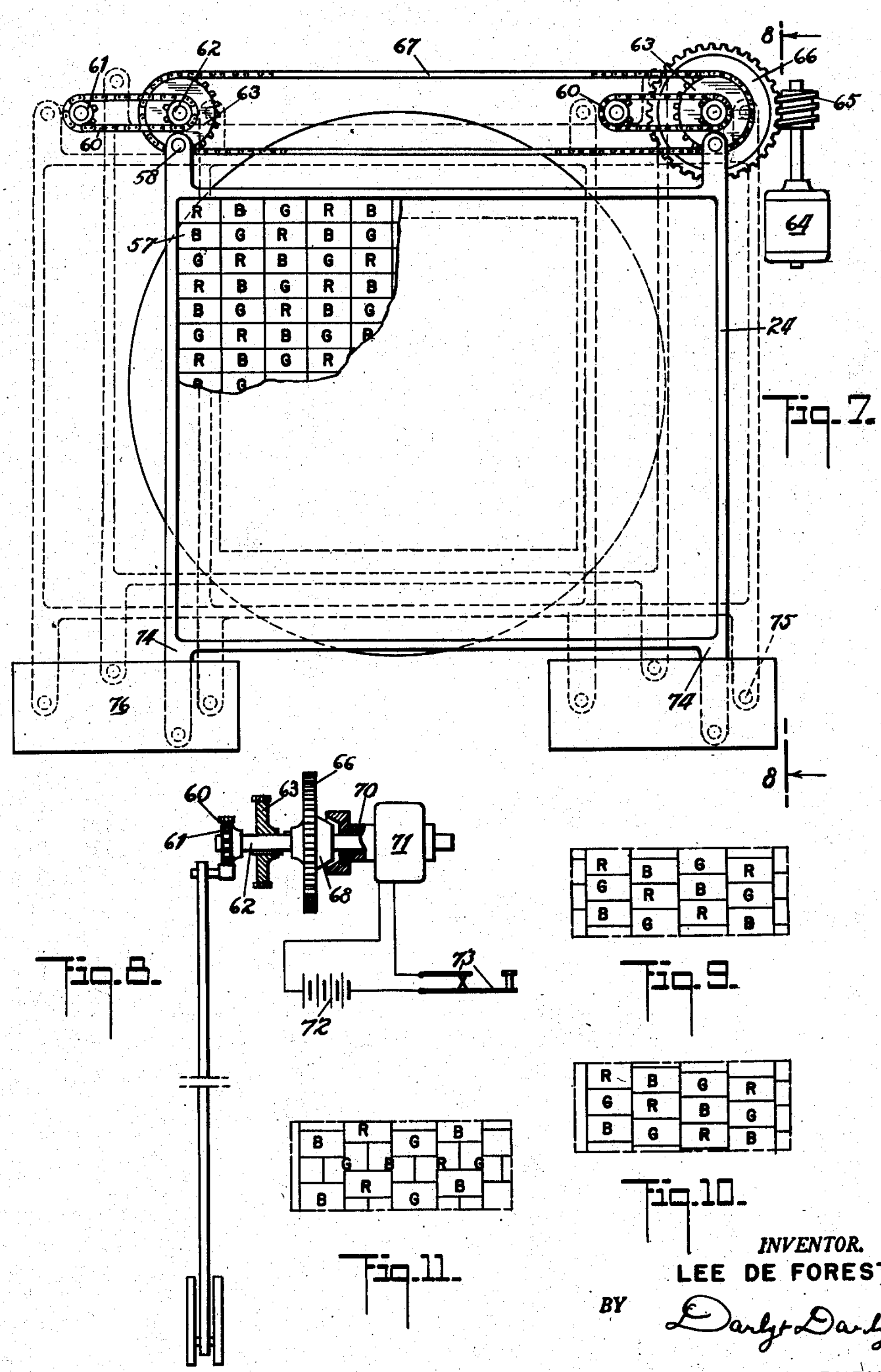
Figure 7 is a front plan view of another form of the screen of my invention showing the mode of operating the screen through an oval path. This view likewise shows a form of screen adapted to this oval movement.
Figure 8 is a side elevation partly in section of the driving means for the screen of Figure 6.
Figure 12:
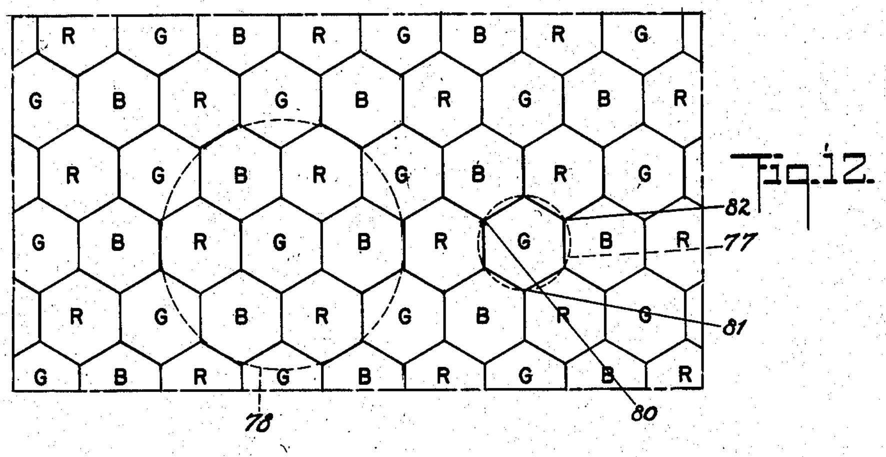
Figure 13:
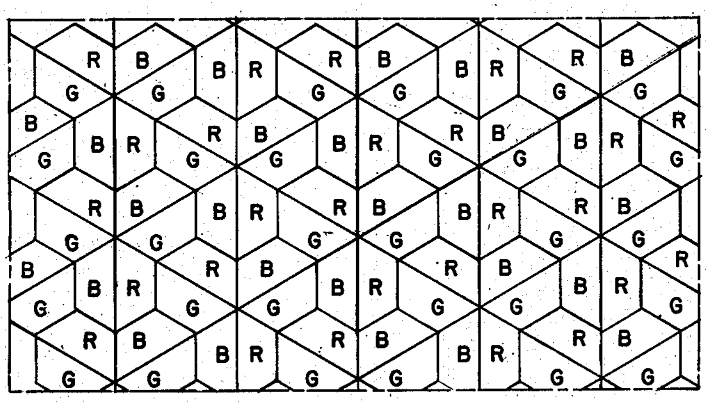
Figure 14:
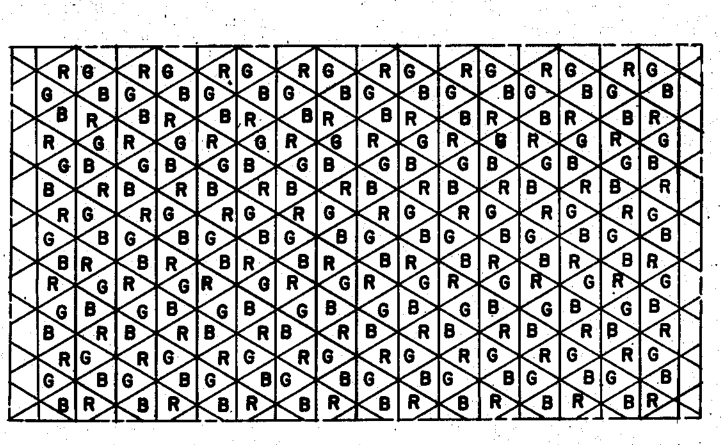

Figures 9, 10 and 11 are front elevations of modifications of the screen which may be utilized particularly with the device of Figure 7. These views show different arrangements of the small color areas of the screen; and Figures 12, 13 and 14 are fragmentary portions of modified color area arrangements which may be utilized, the forms shown in these three figures being preferred forms since the use of hexagons or triangles as shown in these figures eliminates all possibility of the scanning beam passing along a horizontal line of division between color areas.

Figures 1, 2:
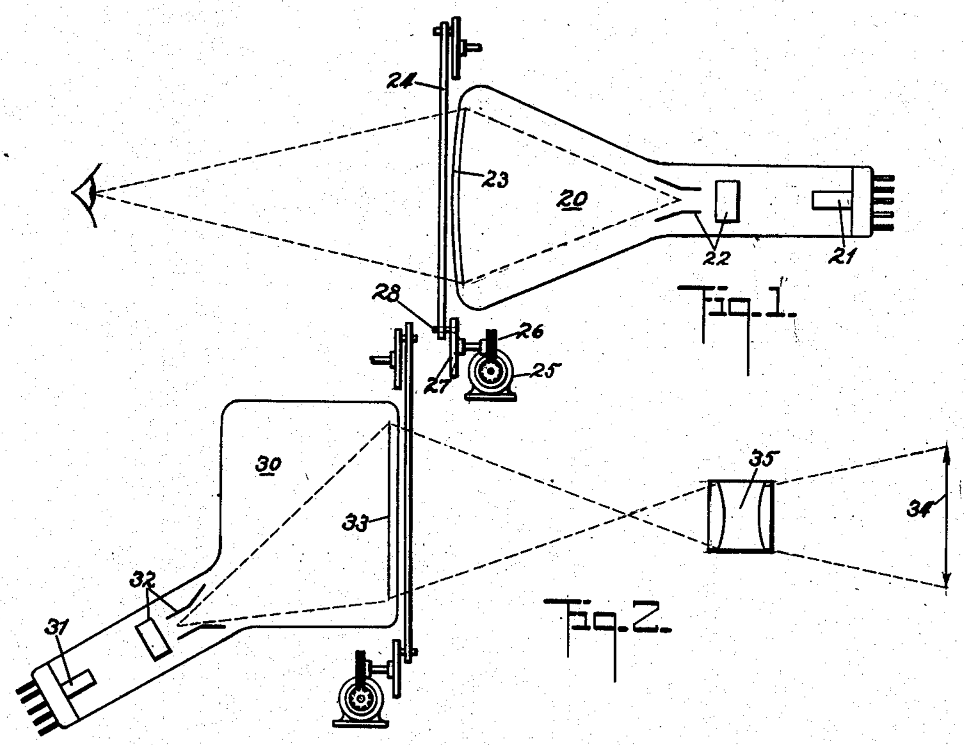
Figure 1 is a conventionalized side elevation of a well known type of television receiving tube with the screen of my invention mounted between the tube face and the eye of the observer.
Figure 2 is a similar side elevation of a common type of television "pick-up" or camera tube. This figure shows a color screen in accordance with my invention mounted adjacent the tube face on the exterior thereof and between the tube and the lens system which is utilized therewith.

Referring now to the drawings, Figure 1 illustrates a mode of applying a color screen in accordance with my invention to a kinescope or television receiving tube. In this drawing 20 represents the receiving tube having the usual cathode gun 21 and the usual pairs of electrostatic deflection plates 22 which serve to deflect the cathode beam in the horizontal and vertical directions for sweeping over the surface of the fluorescent coating on the tube face 23. When, as in the showing of Figure 1, the face 23 of the kinescope 20 is relatively flat, I utilize a flat color screen preferably of plastic material which is stretched tightly upon a rectangular frame 24. The frame 24 is given a circular parallel motion by means of a motor 25 which through a gear 26 and crank disc 27 drives the frame. The connection between the crank disc 27 and the frame 24 is achieved in the usual manner through the medium of a crank pin 28 which is mounted in the crank disc and pivotally connected to a portion of the frame. The details of this drive will be more fully explained hereinafter.

A frame similar to that discussed hereinabove may likewise be utilized for supporting a color screen for parallel circular movement before the television camera. In Figure 2 such a camera is shown at 30, the device being provided with the cathode gun 31, the deflecting plates 32 and the usual light sensitive surface 33. When the surface lies closely adjacent the face of the tube as shown in Figure 2, a color screen exactly identical with that described in connection with Figure 1 and, therefore, given the same reference numerals is provided adjacent the exterior of the tube face. Then in the usual manner an object 34 may have its image cast upon a color screen in the rectangular frame 24 and through it upon the light sensitive mosaic 33 by means of the lens 35.

Some forms of television cameras have the light sensitive surface located within the tube and spaced from the face thereof. When this is true the arrangement described above in connection with Figure 2 would result in parallax and could not be utilized. I have shown in Figure 3, therefore, an arrangement which overcomes this objection and renders my color screen having parallel circular movement usable in connection with the camera form illustrated in Figure 3. In this figure the light sensitive surface 33 is located, as stated, away from the tube face. Therefore, I place the color screen of my invention in the frame 24 at a considerable distance in front of the iconoscope and utilize a lens 36 for casing the image of the color screen upon the screen 33. It will, of course, be understood that the image of the object 34 is superimposed by means of the lens 35 upon the color screen in the frame 24 so that the picture image as well as the screen image are focused upon the mosaic 33.

The above description has been concerned with kinescopes or camera tubes having relatively flat faces. Frequently, however, television receiving tubes or kinescopes have spherically curved surfaces and if a flat screen such as has been indicated above were utilized with these tubes then parallax or false color perception would be apparent, particularly when the observer was located at an angle greater than approximately 15° from the projected axis of the kinescope. In these cases, I prefer to similarly curve the color screen in the manner illustrated particularly in Figures 4 and 5.

Figure 4:
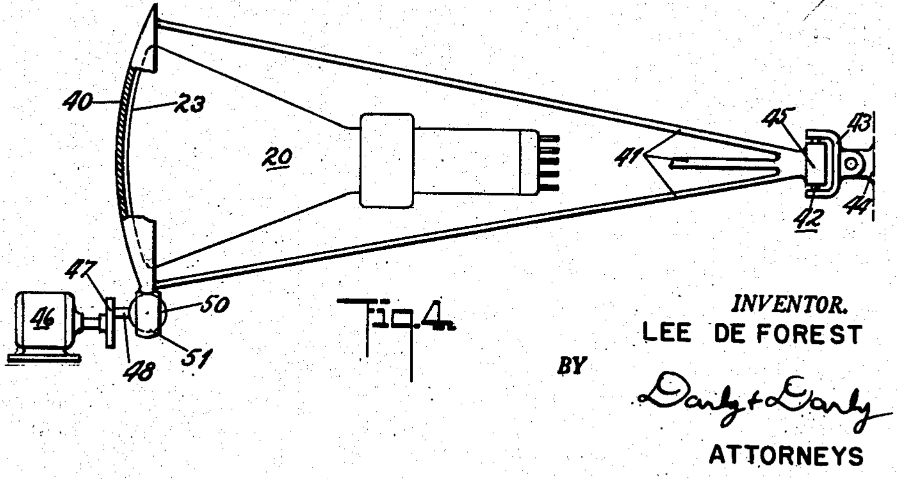
Figure 4 is a view similar to Figure 1 but shows a mounting of a color screen and shaping thereof to permit all portions of the screen to lie closely adjacent the face of the tube. In this figure a tube is shown which has a relatively large radius of spherical curvature.

Referring now particularly to Figure 4, I have shown therein a kinescope 20 similar to that of Figure 1 except that the face 23 thereof is spherically curved, the curvature being one of relatively great radius. In this event the color screen 40, preferably made of plastic, is curved to the same radius as the tube face 23. The screen 40 is then mounted on arms 41 which are in turn connected to a universal joint 42 which comprises yoke member 43 pivotally mounted upon the bracket 44 which is supported in any suitable manner. Pivotally mounted in a vertical axis of the member 43 is the ring or collar 45 to which the arms 41 are directly connected. Due to this universal joint support, the color screen 40 may have imparted to it a parallel orbital movement similar to the movement of the flat screen described hereinabove. Thus in Figure 4 I have shown a motor 46 driving a crank disc 47 and crank pin 48, the pin 48 terminating in a ball 50 which cooperates with a socket 51 connected with or made integral with one of the arms 41 or the color screen 40.

Figure 5:
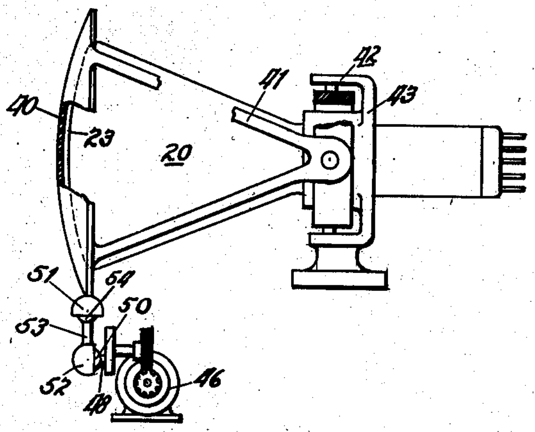
Figure 5 is a view similar to Figure 4 but showing a tube in which the radius of curvature of the tube face is smaller, the mechanism for supporting the color screen being, therefore, differently proportioned and differently constructed.

Some kinescopes are made which have a rather small radius of curvature in which event the mechanism described in connection with Figure 4 would not be suitable. In Figure 5 I have shown an arrangement of a universal joint similar to that in Figure 4 and, therefore, referred to by the same reference characters. This universal joint is, however, so constructed that the yoke member 43 of the universal joint 42 extends on either side of the stem of the tube 20, thus permitting the supporting arms 41 to have a length equal to the radius of the face 23 of the tube 20. In Figure 5 I have shown a driving means which is generally similar to that shown in Figure 4 except, however, that the ball termination 50 of the crank pin 48 is encompassed by a socket 52 rather than by the socket 51 fixed to the color screen 40 or arms 41 as the case may be. The socket member 52 forms one end of a connecting rod 53, the other end of which terminates in a ball 54 fitting in the socket 51.

Figure 3:
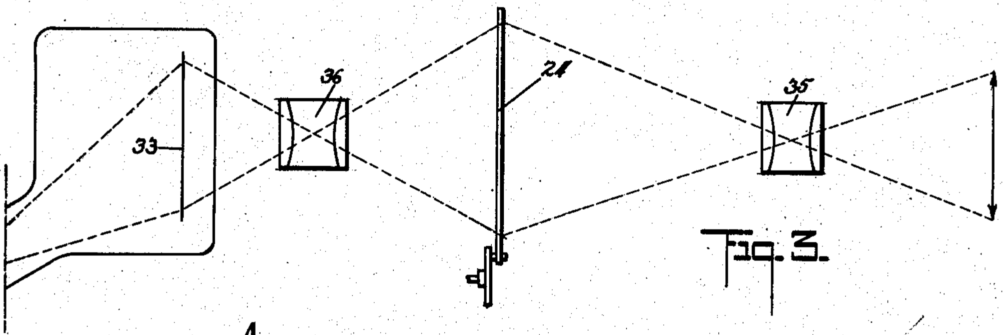
Figure 3 is a view similar to Figure 2 but showing a different form of iconoscope in which the filter screen is spaced from the tube face. In utilizing my color screen with this type of tube the screen is spaced from the tube and the screen image is focused on the light sensitive surface by a lens system as shown in Figure 3.
Figure 6:
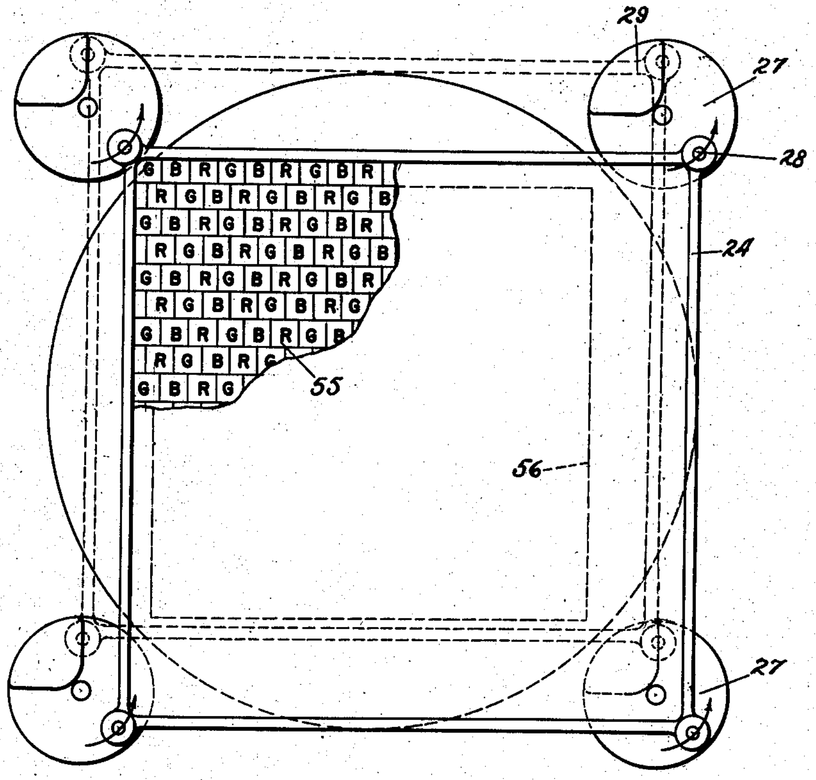
Figure 6 is a front elevational view of a color screen in accordance with my invention showing particularly means for mounting the screen for movement through a circular orbit and showing likewise one form of color screen, that is one arrangement of the elemental areas of the three primary colors.

One mode of imparting a circular parallel movement to a frame such as the frame 24 of Figures 1 through 3 and, of course, to the color screen stretched thereupon is illustrated in Figure 6. Here the frame 24 is shown as indicated in the preceding figures mounted upon crank pins 28 in the crank discs 27. In the preferred form of this device one of the crank discs 27 will be driven through suitable gearing, such as shown at 26 in Figure 1, by a motor such as 25 and the remaining crank discs 27 will be chain driven from the one. Preferably each crank disc is provided with a counterweight 29 so that the weight of the frame will not cause unwanted vibration. It will be understood that the frame 24 should be constructed of light material, such for example as magnesium.

In Figure 6 there has been illustrated a portion of a color screen 55, this screen comprising a plurality of horizontal rows of colored rectangles each row comprising rectangles of red or magenta, yellow-green and blue-violet successively and the rows being so staggered that two blocks of the same color are never adjacent each other. In Figure 6 the outlines of the picture raster on the face of the kinescope or of the mosaic plate of the iconoscope, as the case may be, is indicated by the dotted line 56. It will be obvious that the area included within the dotted line 56 is always covered by the color screen 55.

The mechanism of Figure 6 like that of Figures 1 through 3 and 6 will impart to each color segment or unit a circular path thus presenting before each individual element of the viewing face of the kinescope or of the mosaic of the iconoscope a rapid succession of the three primary colors. With this type of screen movement, I have found that unless the diameter of the circle through which each color segment moves, i. e. the diameter of the circle through which the entire screen moves is quite large relative to the dimensions of the individual color segments, certain elements of the light sensitive screen, or the fluorescent screen are not subjected to all three colors equally or during an equal amount of time during a complete cycle of the circular motion. In fact, the ratio of the diameter of the circular path to the dimensions of the individual color elements must be of the order of 20 to 1 and this limitation calls either for a large throw of the screen or for very small color segments or units. This illustration, however, applies only in the case that the color units are of generally rectangular form and may be avoided where the color segments are hexagonal or triangular, as will be hereinafter explained.

The limitation mentioned above may also be avoided even when generally rectangular color segments are utilized. This may readily be accomplished by providing the color screen itself with a generally rectangular movement. In Figures 7 and 8 there are illustrated means for providing a flat screen with such an oblong orbit of movement. While this showing is limited to a flat screen it will be understood that a spherically curved screen, such as that indicated at 40 in Figures 4 and 5, may readily be provided with the same type of movement, as will be hereinafter explained.

Referring now to Figures 7 and 8, the color screen frame 24 is provided with a color screen 57 which differs somewhat from the screen 55 previously described, particularly in that the horizontal rows of successive colors are not staggered as in the screen 55 but have their lines of juncture adjacent one another, the colors, however, being so located that no two blocks of the same color are adjacent each other. The frame 24 is in this instance supported from its top by means of pins 58 extending rearwardly from the frame and each being pivotally mounted on a chain 60. The two chains 60 are mounted on sprocket wheels 61, one of each pair of sprocket wheels being mounted on a shaft 62 which is in turn driven by a sprocket wheel 63. As shown in Figures 7 and 8, the righthand one of the shafts 62 is driven by a motor 64, worm 65 and wormwheel 66, the motion of the righthand shaft 62 being transmitted through righthand sprocket 63 and chain 67 to the lefthand sprocket wheel 63. The worm gear 66 is loosely mounted on the righthand shaft 62 and carries at its center a soft iron conically shaped member 68. A cooperating conically dished member 70 is splined to the shaft 62, this member comprising the core of the fixed electromagnetic solenoid coil 71. The solenoid coil 71 is connected, as shown, to a source of current, preferably direct current, here indicated as a battery 72 and this circuit includes not only the battery but a break key 73. When the circuit is closed, as shown, the solenoid is energized causing the core 70 of the solenoid to become strongly attracted to the conically shaped hub portion 68 of the gear 66. Thus the motor 64 drives the righthand one of the shafts 62 and through the various sprockets mentioned causes the frame 24 to move in a generally oblong pattern.

With this structure the screen 24 moves first in an essentially horizontal direction right or left relatively slowly at a uniform velocity and as the horizontal motion approaches zero value the screen is apparently rapidly moved in a vertical direction either up or down as the case may be and then moved in the opposite horizontal direction followed by a rapid movement in the opposite vertical direction. The dimensions of the sprocket wheels 61 together with the dimensions of the chain 60 and the positioning of the pins 58 are such that the vertical movement of the frame 24 and color screen 57 therein is equal to the vertical height of one row of color units. Since the colors are staggered in alternate rows of the color screen 57 the relatively rapid shift in a vertical direction brings a different color before each element of the image from the color to which it was last subjected by the preceding horizontal movement of the color screen.

Since the color screen 57 has but three color positions in each horizontal row, i. e. the horizontal movement of the screen is equivalent to the length of three color rectangles of the screen 57, the movements of the screen may readily be caused to be in phase with the movements of the similar synchronously driven screen utilized in connection with the taking of the television picture by means of the usual iconoscope.

Thus by operating the key 73 the circuit to the solenoid 71 will be broken and the movement of the screen at the receiving station will be stopped. The release of the key will cause the screen to resume its movement in a different phase relation with the camera color screen. The operator can readily tell when the screens are in phase since at that time, and only at that time, will the color rendition of the received picture image be correct. If desirable, the members 68 and 70 forming a magnetic clutch may be supplied with three cooperating clutch teeth so that the phase relationship of the camera and kinescope screen may readily be altered by 120° upon each opening of the key 73. Thus the user may be assured that not more than two operations of the key will be necessary to bring the two screens into proper phase relationship.

In order to prevent any movement of the lower part of the screen frame 24 and the screen 57 in a direction normal to its usual vertical plane of movement, projecting tongues 74 are supplied at the lower corners of the frame and hardened round ended pins 75 are inserted through the tongues. These pins travel in grooves in plates 76 which grooves have side walls which are parallel to each other and provided with a smooth hard surface.

It will be obvious that curved screens of the type described in connection with Figures 4 and 5 may be driven by a means similar to that shown in Figures 7 and 8, it being only necessary in order to do this that there be substituted for the pins 58 a ball and socket arrangement of the type shown particularly in Figure 5.

When a curved screen is utilized in connection with the type of movement shown in Figure 7, the lower ends of the screen frame will be guided by a link and ball and socket arrangement rather than by the pins 75 and grooved plates 76 described hereinabove.

As has been indicated hereinabove, various types of color screens may be utilized. The color units may be rectangular, hexagonal or triangular and may be arranged in a number of different ways in order to produce the proper color rendition when the screen is given the parallel orbital movement, either circular or oval described above.

Before describing the detailed screen arrangements the conditions which must be satisfied will be considered.

It is a characteristic of the iconoscope mosaic that an element thereof which is exposed to light continues to emit electrons in proportion to the intensity of light falling thereon during the relatively long intervals between the successive scannings of that element by the cathode beam.

As a preferred arrangement, a flying spot or image disector tube is utilized at the transmitter to insure the stored signals do not interfere with the scanning but provide that the screen elements be discharged for each new scanning operation.

The maximum of signal response when the cathode beam sweeps over a mosaic element occurs when the element is exposed to the light projected thereon for $\frac{1}{30}$ of a second or between the successive odd or even field scannings. In utilizing the mechanisms hereinabove described in connection with color screens, as generally described above and as described in detail hereinafter, certain elements of the mosaic located in a position in which they are exposed to a single color of light during the entire scanning interval or $\frac{1}{30}$ of a second (with the present television scanning pattern) will give off a stronger electronic signal than elements less favorably located. Nonetheless, when color blocks as small as is practical are employed in cooperation with the minimum of screen displacement speed possible without objectionable visual effect, no observable vertical lines or zones of brightness are noticed in viewing the received picture. Further, when the improved "image-orthicon" television camera is used behind a checkered tri-colored screen as herein disclosed, it is found that the level of the signals picked up from every portion of the screen is ample for satisfactory natural color reproduction of every portion of the scene or picture which is being projected upon the mosaic of the iconoscope at the transmitter.

I have found that if the dimensions of each color block is of the order of $\frac{1}{4}''$ in a horizontal direction by $\frac{1}{8}''$ in a vertical direction and the speed of horizontal movement is $\frac{1}{4}''$ in $\frac{1}{30}$ of a second or $\frac{3}{4}''$ (that is, the complete three color area) in $\frac{1}{10}$ second, the natural color optical illusion is complete and the brightness of the picture projected on the kinescope screen and viewed through the synchronously moving tri-color screen is ample for the purpose intended.

If the color blocks are of greater dimensions than those mentioned above, then correspondingly greater speeds of screen movement are required in order to maintain the same rate of color shift.

In the screen, a fragment of which is shown in Figure 6, the color units are rectangles and each row comprises a series of repetitions of three color blocks which are successively colored red or magneta, yellow-green and blue-violet, are positioned to create the sensation of white light in the eye when passed in rapid succession before it. In the screen 55 of Figure 6 the color rectangles are staggered in successive rows so that, for example, the junction line between a red and blue rectangle in the second row will be adjacent a green rectangle in the 1st and 3rd rows. I have found, however, that great advantage is obtained by using hexagonally or triangularly shaped color elements.

In Figure 12 there is shown an enlarged section of a three color screen which is particularly adapted for utilization in connection with the devices shown, for example, in Figures 1 through 6. This color screen comprises a plurality of rows of staggered hexagonally shaped segments. I prefer to so arrange the hexagonal segments that the horizontal scanning line of the cathode beam traverses all boundary lines at an angle either a right angle or a 30° angle and does not at any point of its travel follow along or parallel to a side of the hexagons. The advantage of this arrangement is obvious since it avoids any picture element remaining behind the line of juncture of two colors for any appreciable time.

As shown in Figure 12, one desirable path of movement is a circle which encloses a single hexagon. This is illustrated by the circle shown in dotted lines and designated 77 in Figure 12. Another possible orbit of movement for the screen of Figure 12 is the circle circumscribing seven hexagons of which six are grouped symmetrically about the seventh central one. Such a circle is shown in dotted lines in Figure 12 and designated 78.

Consider now the orbit designated by the reference numeral 77; when the screen is caused to move therethrough, each element of the screen being moved through 360° without rotation, it will be seen that the corner of the hexagon designated 80 will follow the circular path indicated and that when point 80 is in the position indicated every element of the picture lying behind the inscribed hexagon will be seen through blue light. When this corner 80 has been moved along the circular path 77 through 120° to the point marked 81, every picture element lying within the hexagon in question will be seen through red light. Similarly when the point 80 of the color screen is moved further along its circular path in clockwise direction to the 240° position indicated at 82, every point within the hexagonal area of the screen or mosaic will be seen through green light. In the same manner every element of the picture will be seen through the three primary colors successively as the screen is moved over the circular path or orbit above considered.

If the speed of circular motion of the screen is such that a complete cycle of movement occupies $\frac{1}{10}$ second then each picture element will have been subjected to or viewed through the three primary colors during that cycle of movement. Once during each cycle all elements included in the space enclosed in a hexagonal area of the transmitting or receiving television tube will be exposed to one of the three primary colors.

If instead of the smaller circular orbit described above the larger circular orbit 78 be considered, it will be seen that any given hexagonal area of the picture will be subjected to each of the three primary colors twice during a complete cycle. In either case in order that the color illumination of every portion of the picture be uniform, that the circular orbit be traversed in $\frac{1}{10}$ second or in some multiple of this interval, is a necessity.

As stated hereinabove, not only hexagons but other shapes may be utilized. Thus in Figure 13, I have shown a screen pattern generally similar to that of Figure 12 but in which each hexagon is bisected and the colors arranged so that no two adjacent segments shall be of the same color. As in Figure 12 the color arrangement is indicated by the letters *r*, *b*, and *g* standing, respectively, of course, for red, blue and green.

A further and preferred variation of the screen arrangement is shown in Figure 14 in which the screen is composed of equal area equilateral triangles arranged in groups of six forming hexagons. With such arrangement the circle of motion of the screen may be of various dimensions. For example, the circle may be small enough to be inscribed within the hexagon formed by six triangles or may be of considerably larger diameter. Whatever the size of the screen orbit the speed of movement of the screen should be such that in 1/10 second or a multiple thereof any point on an imaginary circle of this size when laid upon any portion of the color screen will pass through at least three different color elements. When this is the case any picture element will be viewed at least once through each of the three colors while the screen sweeps through one complete circular movement.

When utilizing the oval movement or movement through an oval orbit as described in connection with Figures 7 and 8, a screen such as that shown in Figure 8 at 57 may be utilized. This screen comprises rows of rectangles arranged in the order, red, blue, green, the color blocks being likewise arranged in columns but the rows being so positioned that the green block of the second row is beneath the red block in the first row and the blue block of the third row is beneath a green block in the second row. Obviously this arrangement can be slightly altered as far as the succession of colors and columns is concerned, it being only necessary that no two blocks of the same color lie adjacent each other.

The screen 57 of Figure 7 is subject to the disadvantage that a picture element may rest continually throughout the horizontal movement of the screen 57 behind an unbroken horizontal line separating one row of color blocks from the next row. Although the width of such a horizontal line is exceedingly narrow, this can be prevented at the same time other advantages are secured by staggering the alternate vertical color columns relative to their next adjacent color columns. One such non-progressive arrangement is illustrated in Figure 9 and another in which the color blocks are progressively staggered is illustrated in Figure 10. The arrangements of Figures 9 and 10, in addition to preventing a picture element from lying behind an unbroken horizontal line of color separation also insure that picture elements do not lie partly behind one color and partly behind another color as the color screen moves horizontally.

Inasmuch as under existing standards of television scanning as set up by the Radio Manufacturers Association of America (RMA) a frame or individual picture is completely scanned by the cathode beam in 1/30 second, it is preferable to so dimension the color blocks and so regulate the speed of horizontal shift of the color screen as 57 of Figure 7, that each individual color block or element is moved horizontally from one end to the other thereof in 1/30 second. However, a satisfactory result is also obtained if the horizontal width of the color blocks is reduced by 1/2, or the horizontal speed of the screen is increased by 2, so that in one field scan occupying 1/60 second any individual element of the iconoscope mosaic which lies behind and near the left-hand margin of any color block when the left-hand motion of the scan is beginning will be subjected only to light from that color throughout the duration of that field scan. Elements of the mosaic located on other than the margins of the color block may be subjected to two colors successively during one field or one frame of scanning time and may be subjected to these two colors for unequal time durations unless the element happens to be located behind the central part of the color block in which the time durations will be equal.

In order to insure a more even distribution of time duration to which any mosaic element is subjected to the various colors during a scanning period, the color blocks may be shaped as shown in Figure 11. In this figure alternate horizontal rows of color blocks are of regular rectangular shape but the individual blocks of the rows are staggered vertically with respect to each other. Further the staggered horizontal rows mentioned are spaced apart and between these horizontal rows of staggered blocks are blocks which extend from the center of one block to the center of the horizontally adjacent block. The successive colors are so chosen, as shown on Figure 11, that any color block lies adjacent to two blocks, one of each of the other two colors. Thus, as shown, a red block in the central row of the three shown in Figure 11 is located symmetrically below a green and a blue rectangular block and symmetrically above a green and a blue rectangular block. By this arrangement the horizontal lines are also broken up so that there can be no scanning which presents a picture element constantly to two color segments.

While I have described a number of color screens and a number of modes of moving these color screens through paths in what has been termed parallel orbital movement, it will be understood that many other variations of the color screens may be devised and that the parallel orbital movement described in detail as circular or oval may take other forms within the definition of parallel orbital movement. I, therefore, wish to be limited not by the foregoing specification which was given solely for the purpose of conveying understanding of my invention but, on the other hand, to be limited only by the claims granted me.

What is claimed is:

1. A color screen for use in color television apparatus, said screen comprising hexagonal color segments of the three primary colors, said hexagonal segments being arranged in rows with one pair of opposite sides of the hexagons extending perpendicularly to the line of scanning and each hexagon being separated from every other hexagon of the same color.

2. Color television apparatus comprising a color screen as defined in claim 1, and means for imparting parallel orbital movement to said screen.

3. Color television apparatus comprising a color screen as defined in claim 1, and means for imparting parallel circular movement to said screen.

4. Color television apparatus comprising a color screen as defined in claim 1, and means for imparting parallel movement in a generally oval path.

5. A color screen for use in color television apparatus, said screen comprising a plurality of segments of the three primary colors, each said segment having the form of a bisected hexagon, the line of bisection extending from one corner to the diametrically opposite one, said color segments being arranged in horizontal rows.

6. Color television apparatus comprising a color screen as defined in claim 5, and means for imparting parallel orbital movement to said screen.

7. Color television apparatus comprising a color screen as defined in claim 5, and means for imparting parallel circular movement to said screen.

8. A color screen for use in color television apparatus, said screen comprising a plurality of segments of the three primary colors, each said segment having the form of a bisected hexagon, the line of bisection extending from one corner to the diametrically opposite one, said color segments being arranged in horizontal rows of hexagons, said hexagons having one pair of parallel sides extending perpendicularly to the line of scanning and having their color segments in the shape of bisected hexagons so arranged that no color segment lies adjacent a segment of the same color.

9. Color television apparatus comprising a color screen as defined in claim 8, and means for imparting parallel orbital movement to said screen.

10. Color television apparatus comprising a color screen as defined in claim 8, and means for imparting parallel circular movement to said screen.

11. A color screen for use in color television apparatus, said screen comprising a plurality of equilateral triangular color segments of the three primary colors, said triangular segments being arranged in groups of six forming hexagons, said hexagons being arranged in rows with a pair of parallel sides extending perpendicular to the direction of scanning, said equilateral triangular segments being so arranged that no segment is adjoined by another of the same color.

12. Color television apparatus comprising a color screen as defined in claim 11, and means for imparting parallel orbital movement to said screen.

13. Color television apparatus comprising a color screen as defined in claim 11, and means for imparting parallel circular movement to said screen.

LEE DE FOREST.

REFERENCES CITED

The following references are of record in the file of this patent:

UNITED STATES PATENTS

| Number | Name | Date |
|---|---|---|
| 2,294,820 | Wilson | Sept. 1, 1942 |
| 2,307,188 | Bedford | Jan. 5, 1943 |
| 2,389,979 | Huffnagle | Nov. 27, 1945 |
| 2,416,053 | Kallman | Feb. 18, 1947 |
| 2,431,115 | Goldsmith | Nov. 18, 1947 |
| 2,452,293 | De Forest | Oct. 26, 1948 |
| 2,455,710 | Szegho | Dec. 7, 1948 |
| 2,457,415 | Sziklai | Dec. 28, 1948 |
| 2,508,267 | Kasperowicz | Apr. 16, 1950 |

FOREIGN PATENTS

| Number | Country | Date |
|---|---|---|
| 589,345 | Great Britain | June 18, 1947 |